US012208745B2

(12) United States Patent
Maeda et al.

(10) Patent No.: US 12,208,745 B2
(45) Date of Patent: Jan. 28, 2025

(54) WATER INTRUSION PREVENTION SYSTEM FOR ROOF TOP MODULE

(71) Applicant: Honda Motor Co., Ltd., Tokyo (JP)

(72) Inventors: Atsushi Maeda, Chofu (JP); Leo Nakamura, Yokohama (JP)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 17/975,425

(22) Filed: Oct. 27, 2022

(65) Prior Publication Data

US 2024/0140321 A1    May 2, 2024

(51) Int. Cl.
*B60R 11/00* (2006.01)
*B62D 25/06* (2006.01)

(52) U.S. Cl.
CPC ......... *B60R 11/00* (2013.01); *B60R 2011/004* (2013.01); *B60R 2011/0052* (2013.01); *B62D 25/06* (2013.01)

(58) Field of Classification Search
CPC ... B60R 11/00; B60R 11/04; B60R 2011/004; B60R 2011/0052; B62D 25/06; G01S 2013/93273
See application file for complete search history.

(56) References Cited

U.S. PATENT DOCUMENTS

| | | | |
|---|---|---|---|
| 4,834,448 A * | 5/1989 | Sakamoto | B62D 25/06 296/210 |
| 5,706,989 A | 1/1998 | Vincent | |
| 9,738,253 B2 | 8/2017 | Czyz et al. | |
| 9,963,018 B2 | 5/2018 | Williams et al. | |
| 10,071,773 B2 | 9/2018 | Williams et al. | |
| 10,099,630 B1 | 10/2018 | Krishnan et al. | |
| 10,129,445 B2 | 11/2018 | Minikey, Jr. et al. | |
| 10,150,432 B2 | 12/2018 | Dry et al. | |
| 10,272,850 B2 | 4/2019 | Frank et al. | |

(Continued)

FOREIGN PATENT DOCUMENTS

| CN | 112455353 A | 3/2021 |
|---|---|---|
| DE | 102007039196 A1 | 1/2009 |

(Continued)

OTHER PUBLICATIONS

Office Action of U.S. Appl. No. 17/975,530 dated Dec. 7, 2023, 12 pages.

(Continued)

*Primary Examiner* — James A English
(74) *Attorney, Agent, or Firm* — Mark E. Duell; Rankin, Hill & Clark LLP

(57) ABSTRACT

A water intrusion prevention system for a roof top sensor module includes a bolt, a cap nut, gaskets, and a rib. The module is connected to a roof of an autonomous vehicle, and includes a shell defining an interior and a sensor arranged therein. A shaft of the bolt is inserted up through an opening in the roof, up through an opening in the shell, and up through an opening in the rib so that a top portion of the shaft is arranged in the interior. The top portion of the shaft and the cap nut are connected together in the interior, which connects the module to the roof. The cap nut and the gaskets together form a liquid-tight seal that prevents liquid/water in the interior of the shell from passing through the opening in the roof into an interior of the vehicle under the roof.

19 Claims, 7 Drawing Sheets

(56) References Cited

U.S. PATENT DOCUMENTS

| | | | |
|---|---|---|---|
| 10,800,346 B2 | 10/2020 | Taylor et al. | |
| 11,099,039 B2 | 8/2021 | Krishnan et al. | |
| 11,164,491 B2 | 11/2021 | Hornsby et al. | |
| 11,731,705 B2 | 8/2023 | Friedrich et al. | |
| 2005/0082880 A1* | 4/2005 | Lee | B62D 29/043 296/210 |
| 2016/0009227 A1* | 1/2016 | Binder | B60R 9/04 224/324 |
| 2018/0272959 A1* | 9/2018 | Hornsby | G09F 21/042 |
| 2019/0047480 A1 | 2/2019 | Espig | |
| 2020/0084920 A1 | 3/2020 | Frederick et al. | |
| 2020/0366821 A1 | 11/2020 | Silva | |
| 2021/0041529 A1 | 2/2021 | Brown et al. | |
| 2021/0362646 A1 | 11/2021 | Drueppel et al. | |
| 2021/0364631 A1 | 11/2021 | Hasegawa et al. | |
| 2021/0372445 A1* | 12/2021 | Hida | F16B 5/0233 |
| 2022/0203904 A1* | 6/2022 | Higashimachi | B60R 11/00 |
| 2023/0192193 A1 | 6/2023 | Huelsen et al. | |

FOREIGN PATENT DOCUMENTS

| | | |
|---|---|---|
| DE | 102019105339 A1 | 9/2020 |
| DE | 102021123989 B3 | 8/2022 |
| DE | 102021129392 B3 | 8/2022 |
| EP | 2108545 B1 | 5/2011 |
| ES | 2264614 B1 | 2/2008 |
| GB | 2119331 A | 11/1983 |
| JP | 2004276733 A | 10/2004 |
| JP | 5012098 B2 | 8/2012 |
| JP | 2015107764 A | 6/2015 |
| KR | 102085081 B1 | 3/2020 |
| WO | WO2021032559 A1 | 2/2021 |

OTHER PUBLICATIONS

Notice of Allowance of U.S. Appl. No. 17/975,530 dated Apr. 10, 2024, 5 pages.

* cited by examiner

WATER INTRUSION PREVENTION SYSTEM FOR ROOF TOP MODULE

BACKGROUND

Autonomous and other vehicles may include a roof top package including sensors that monitor an environment around the vehicle and provide information for navigating the vehicle. Challenges arise when trying to incorporate such a package onto the vehicle, such as preventing water intrusion into an interior of the vehicle, arranging the package on top of the roof to secure it to the vehicle, and adequately supporting the outer casing of the package and supporting the sensors mounted therein.

BRIEF DESCRIPTION

According to one aspect, a vehicle includes a roof top module connected to a roof of the vehicle. The roof top module includes a shell defining an interior; an electronic device arranged in the interior; a bolt; and a cap nut. A shaft of the bolt extends up through an opening in the roof and up through an opening in the shell such that a top portion of the shaft is arranged in the interior. The shaft and the cap nut are connected to each other in the interior, thereby connecting the shell to the roof and creating a seal around the opening in the shell and thus preventing liquid in the interior from passing through the opening in the shell. The cap nut completely covers the top portion of the shaft.

According to another aspect, a vehicle roof top sensor module is configured to be mounted on a roof of an autonomous vehicle. The vehicle roof top sensor module includes a shell defining an interior; a sensor arranged in the interior and configured to detect a characteristic of the autonomous vehicle or a characteristic of an environment surrounding the autonomous vehicle; a bolt; and a cap nut. A shaft of the bolt is configured to be inserted up through an opening in the roof and up through an opening in the shell such that a top portion of the shaft is arranged in the interior. The shaft and the cap nut are configured to be connected to each other in the interior such that the cap nut completely covers the top portion of the shaft, and thereby connecting the shell to the roof, creating a seal around the opening in the shell and thus preventing liquid in the interior from passing through the opening in the shell.

According to another aspect, a method of making a vehicle includes providing the roof top module. The roof top module includes a shell defining an interior; a sensor arranged in the interior; a bolt; and a cap nut. The method includes attaching the roof top module to a roof of the vehicle by inserting a shaft of the bolt up through an opening in the roof and up through an opening in the shell such that a top portion of the shaft is arranged in the interior, and connecting the shaft and the cap nut to each other in the interior. Connecting the shaft and the cap nut to each other creates a seal around the opening in the shell, thus preventing liquid in the interior from passing through the opening in the shell. The cap nut completely covers the top portion of the shaft. The sensor is configured to detect a characteristic of the autonomous vehicle or a characteristic of an environment surrounding the autonomous vehicle.

DETAILED DESCRIPTION

Figure 1:
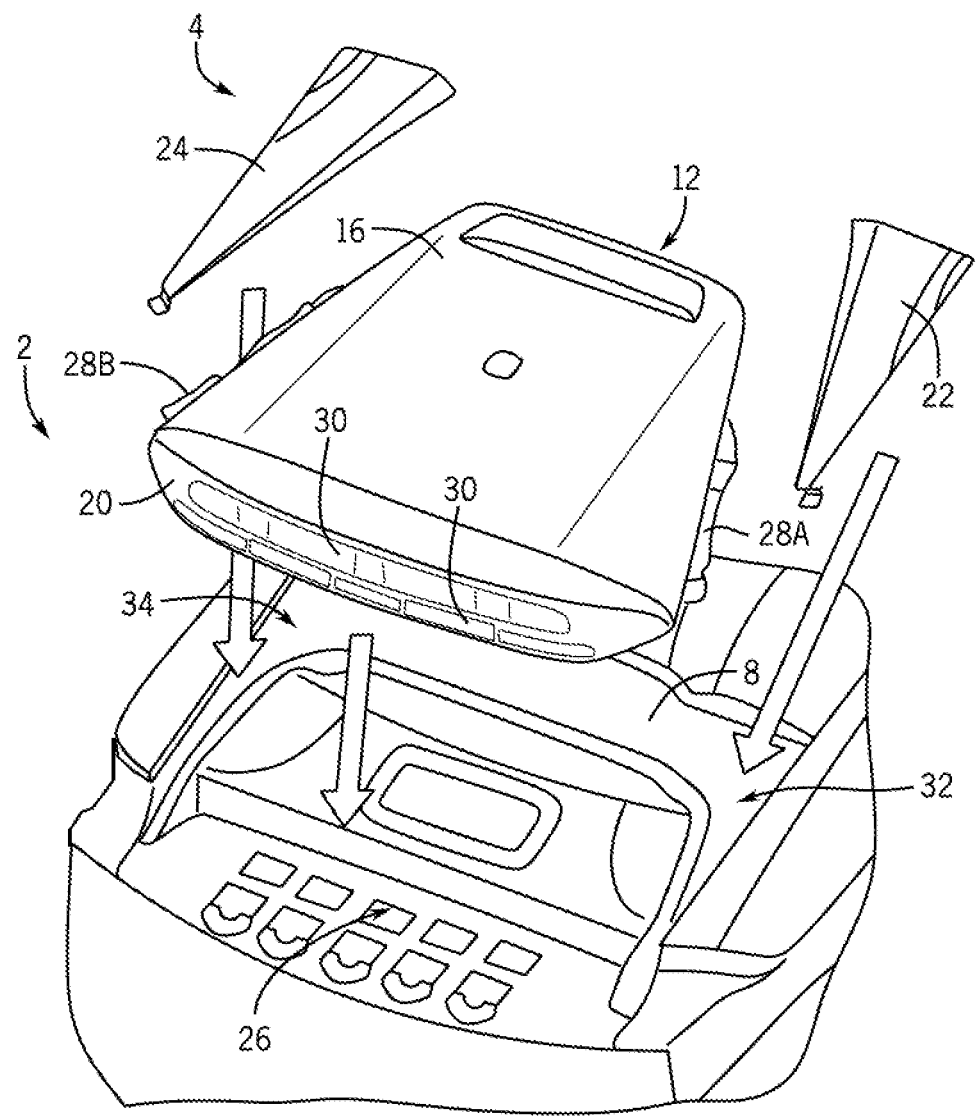
FIG. 1 is a perspective exploded view of a vehicle with a roof top sensor module according to the present subject matter.
Figure 2:
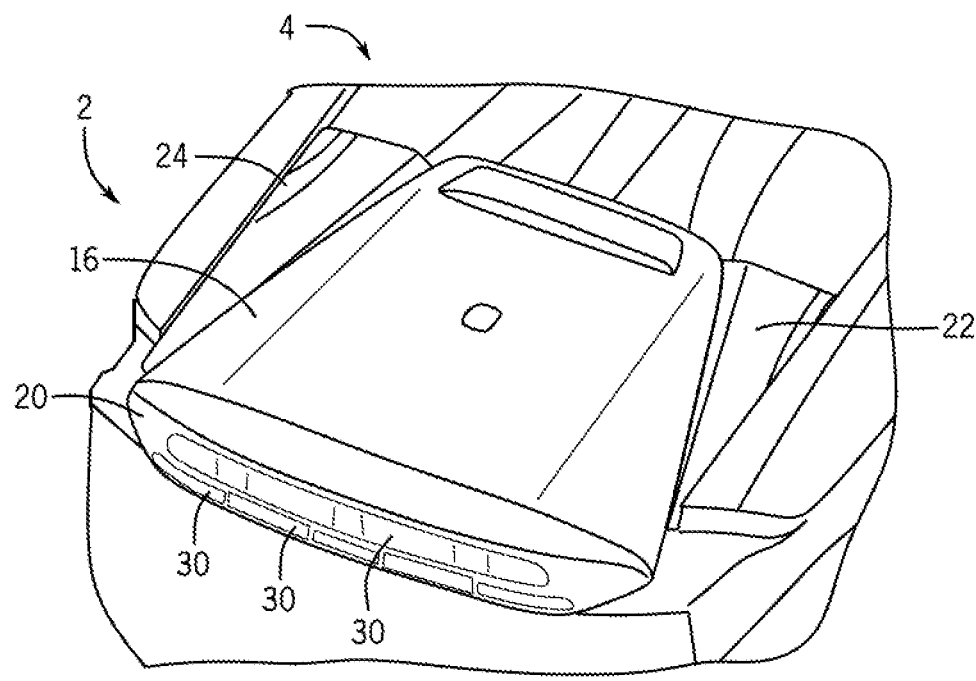
FIG. 2 is a perspective view of a roof top sensor module according to the present subject matter.

Referring to the figures, a vehicle 2 includes a module 4, which is connected to the vehicle 2 and includes one or more electronic devices 6. The vehicle 2 is not particularly limited, and may include a fully user-driven vehicle (all driving performed by the user and no driving automation), a semi-autonomous driven vehicle (some driving performed by the user and some driving automation), or a fully autonomous driven vehicle (complete driving automation and no driving performed by the user). In a non-limiting example, the vehicle 2 is a fully-autonomous driven land vehicle configured to transport people, animals, and/or goods.

The module 4 is modular in construction, and may be arranged anywhere on the vehicle 2. In a non-limiting example, the module 4 is arranged on a top of the vehicle 2, such as on the roof 8 of the vehicle 2, and thus is also referred to herein as a roof top module 4 ("RTM 4") as it is arranged over the roof 8. In a non-limiting example, the RTM 4, also referred to herein as a "roof top sensor module") is mounted to the front portion of the roof 8 of the vehicle 2 as depicted in the figures. The module 4 can be arranged in other locations, such as on the rear portion of the roof 8 or even on the sides or bottom of the vehicle 2.

The RTM 4 may include one or more electronic devices 6. The electronic devices 6 may include a suite of sensors 10 including one or more sensors 10 for detecting characteristics of the vehicle 2, and/or the environment surrounding the vehicle 2 including objects or people around the vehicle 2, and thus may be called a roof top sensor module 4. Other types of electronic devices 6 and non-electronic components may be included as part of the RTM 4. The electronic devices 6 may be powered by a power source (not shown) associated with the vehicle 2, and may be in communication with a vehicle control unit that operates to control one or more functions of the vehicle, e.g. a navigation system that control navigation of the vehicle 2, so as to provide information about the detected characteristics to the vehicle control unit for its operation.

The sensors 10 may include various kinds of instruments for detecting characteristics of the vehicle or of the external environment around the vehicle 2, for example, movement, objects, temperature, moisture/humidity, light, electromagnetic signals/waves/fields/radiation, etc. In a non-limiting example, the electronic devices 6 include a radar 10A for detecting people or objects in the environment around the vehicle 2.

The RTM 4 may include a shell 12 defining an interior 14 in which other components, including the electronic devices 6, may be housed. The shell 12 may include a top panel 16, a bottom panel 18, and a front panel 20. The shell 12 may include more or fewer panels. The RTM 4 may also include a right-side panel 22 and a left-side panel 24, also referred to herein as "appliques". The front panel 20 may include one or more apertures 30 through which the sensors 10 can detect characteristics of the vehicle 2 and/or the environment surrounding the vehicle 2. The top panel 16, the bottom panel 18, and the front panel 20 may combine by connecting to form the interior 14, while the right-side panel/applique 22 and the left-side panel/applique 24 may be used to cover portions of the other panels and/or portions 32, 34 of the roof 8. The shell 12 may combine with these and other panels of the vehicle 2 to define the exterior surface of the vehicle 2.

The top panel 16 may face up, the bottom panel 18 may be arranged under the top panel 16 and be connected to a central portion 26 the roof 8, and the front panel 20 may face forward with the apertures 30 also facing forward. The shell 12 thus covers the central portion 26 of the roof 8. The two side appliques 22, 24 may be connected to the roof 8, and/or the shell 12, to cover respective right and left flanges 28A, 28B of the top panel 16, i.e. flanges 28 of the shell 12, including the lifting features 84, and respective right and left portions 32, 34 of the roof 8 not otherwise covered by the shell 12.

The present subject matter includes a connection and sealing arrangement for making a secure connection between the RTM 4 and the roof 8, and also for inhibiting water/liquid from leaking into an interior 62 of the vehicle 2 as defined by the roof 8. The sealing arrangement includes one or more bolts 36, one or more cap nuts 38, one or more gaskets 40, and/or one or more ribs 42, which cooperate with one or more respective openings 46 in the roof 8 to thereby connect RTM 4 to the roof 8 in a water-tight/liquid-tight manner such that water or other liquid, including water or liquid in the interior 14 of the shell 12, from leaking from above the openings 46 in the roof 8, through the openings 46, and into the interior 62 of the vehicle 2.

In this sealing arrangement, the bottom panel 18 may be connected directly the roof 8 of the vehicle 2. The other panels of the RTM 4 may be connected directly with the roof 8 in a similar manner as described herein with respect to the bottom panel 18, and/or be indirectly connected to the roof 8 via connection with the bottom panel 18.

Figure 5:
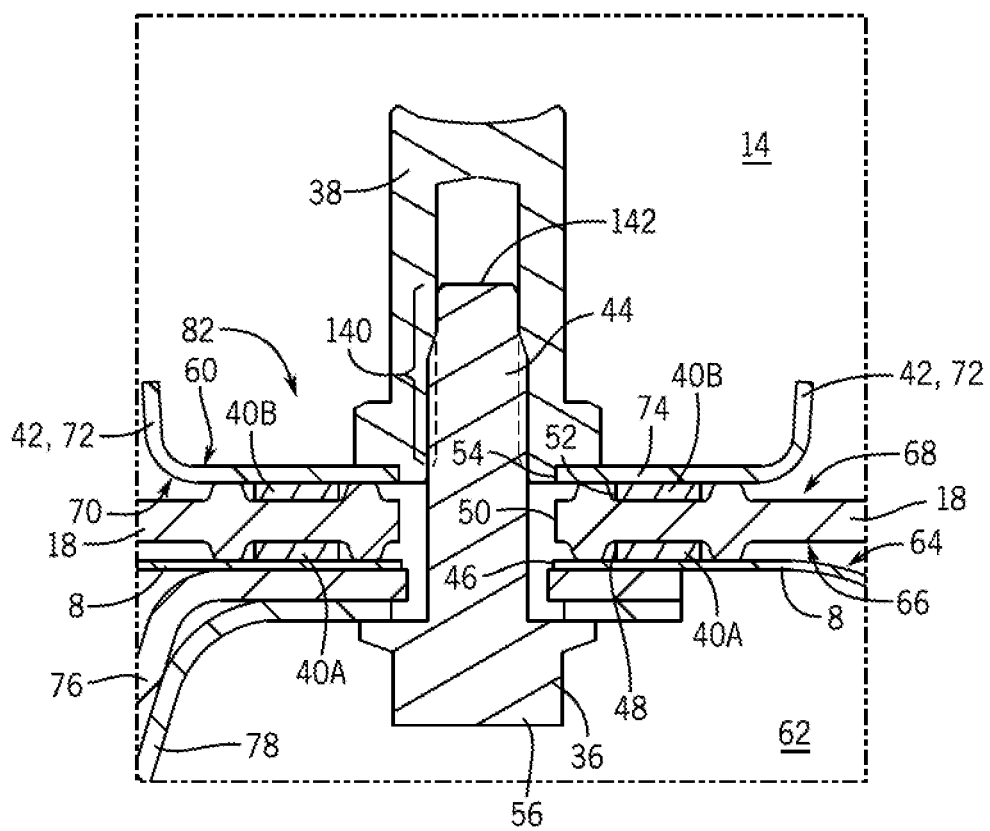
FIG. 5 is a cross section view of the root top module of FIG. 4 taken along line 5-5.

The gaskets 40 may be in the shape of an O-ring or other shapes, and may include a foam sealing material (e.g. a closed or semi-closed cell foam made from EPDM rubber, i.e. ethylene propylene diene monomer rubber foam) or other types of sealing materials. A first gasket 40A may be arranged between the roof 8 and the bottom panel 18 and creates a seal between the roof 8 and the bottom panel 18 around the shaft 44, and a second gasket 40B may be arranged between the bottom panel 18 and the rib 42 and creates a seal between the bottom panel 18 and the rib 42 around the shaft 44. The ribs 42 may have a general U-shape in cross section (See FIG. 5) and include generally vertical portions 72 extending up from a base 74, thus defining a channel 82 between the vertical portions 72 above the base 74.

The sealing arrangement includes a shaft 44 of each bolt 36 being inserted, and thus extending, up through an opening 46 in the roof 8, up through an opening 48 in the first gasket 40A, up through a respective opening 50 in the bottom panel 18 (i.e. an opening 50 in the shell 12), up through an opening 52 in the second gasket 40B, and through a respective opening 54 in a rib 42, and then connected to the cap nut 38. The cap nut 38 is arranged in the rib 42 on the base 74 between the two vertical portions 72, is arranged over the shaft 44, and is securely connected to (e.g. threaded onto) the shaft 44, thus sandwiching the bottom panel 18, the two gaskets 40, the rib 42, and the roof 8 between the head 56 of the bolt 36 and the cap nut 38, thereby connecting the bottom panel 18 directly to the roof 8. The bottom panel 18 may be connected to remaining openings 46 in the roof 8 in the same manner.

Figure 3:
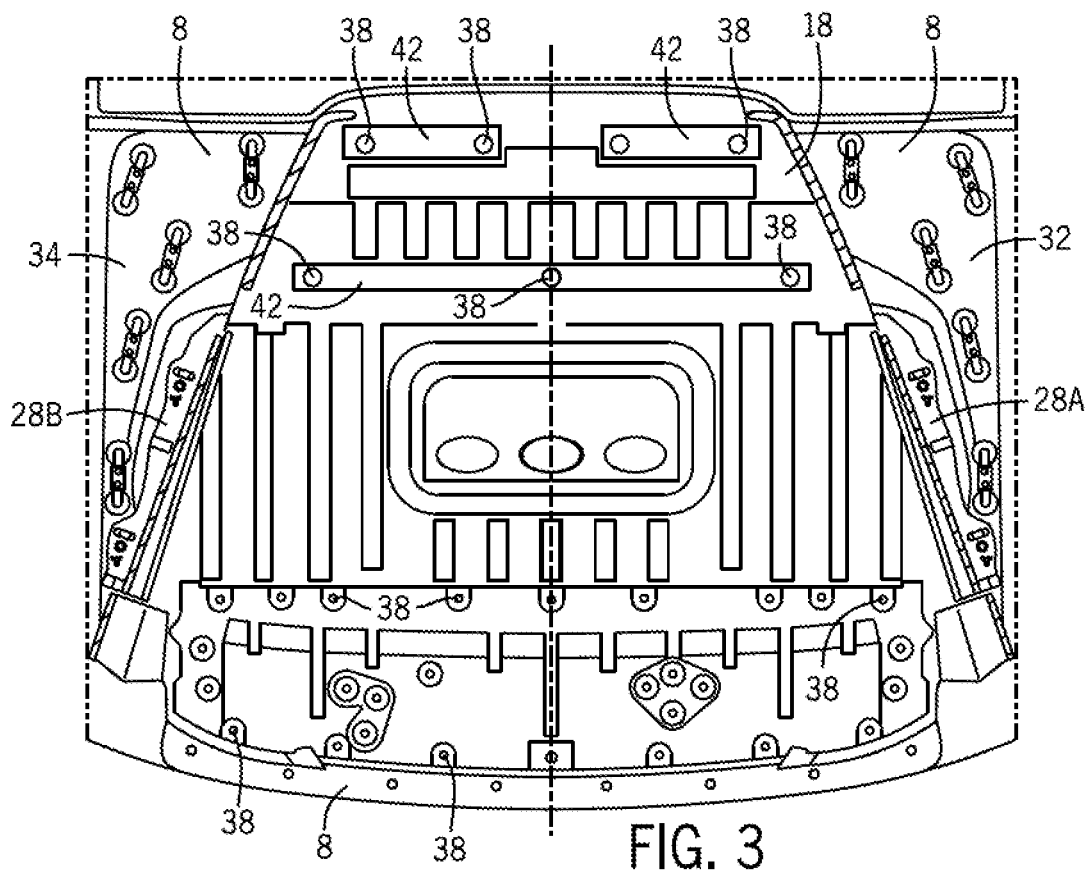
FIG. 3 is a cross sectional view of a roof top sensor module according to the present subject matter.
Figure 4:
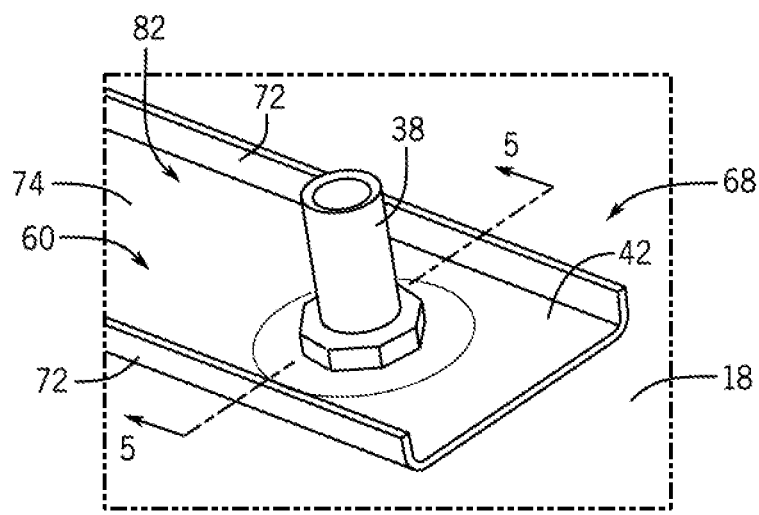
FIG. 4 is a perspective view of a portion of an interior of a roof top module according to the present subject matter.

A common rib 42 may extends over the two or more openings 46 and thus when the bottom panel 18 is connected to the roof 8, the common rib 42 may be sandwiched at each of the two more openings 46 between two or more respective cap nuts 38 and the bottom panel 18. This is shown in FIG. 3 for example, where a common rib 42A spans over two openings 50A, 50B in the bottom panel 18, common rib 42B spans over two openings 50C, 50D in the bottom panel 18, and common rib 42C spans over three openings 50E, 50F, 50G in the bottom panel 18. These ribs 42A, 42B, 42C may be adhered in place on the top surface 68 of the bottom panel 18 by an adhesive. The use of the rib 42 is optional, and some openings 50 in the bottom panel 18 may not have a rib 42 extending over them. For example, opening 50F, 50G, and 50H do not have a rib 42 extending over them, and thus when the bottom panel 18 is connected to the roof 8, no rib 42 is compressed between the cap nut 38 and the head 56 of the bolt 36.

The bottom panel 18 is connected to the roof 8 by mating external threads on the shaft 44 of the bolt 36 with internal threads on the cap nut 38, which thus securely connects the cap nut 38 to the shaft 44. The threads are such that turning the cap nut 38 in a first direction relative to the bolt 36 ("tightening") decreases a distance between the head 56 of the bolt 36 and the cap nut 38, thus squeezing the rib 42, the roof 8, the two gaskets 40, and the bottom panel 18 between them. Turning the cap nut 38 in the opposite second direction relative to the bolt 36 ("loosening") increases a distance between the head 52 of the bolt 36 and the cap nut 38. Other connection devices may be used to secure the cap nut 38 to the shaft 44 of the bolt 36.

When secured/connected together, the bolt 36 and the cap nut 38 operate to seal the openings 46 in the roof 8 to inhibit water/liquid from entering into the interior 62 of the vehicle 2 through the opening 46. When secured/connected to the bolt 36, the cap nut 38 defines a blind hole, which may be threaded, and into which the shaft 44 is inserted such that the cap nut 38 covers (e.g. completely covers) a top portion 140 of the shaft 44. The top portion 140 of the shaft 44 may be that portion that is arranged in the interior 14, and/or extends up past (upward in FIG. 5) the opening 54 in the rib 42. The shaft 44 and the cap nut 38 are connected to each other in the interior 14. The top portion 140 of the shaft 44 includes the tip 142 of the shaft 44. When secured to the bolt 36, the cap nut 38 also presses against, and thus seals to, the top surface 60 of the rib 42 around the opening 54 in the rib 42 and around the shaft 44; the first gasket 40A is compressed between, and thus seals to, the top surface 64 of the roof 8 and the bottom surface 66 of the bottom panel 18 and around the opening 50 in the bottom panel 18 and around the opening 54 in the rib and around the shaft 44; and the second gasket 40B is compressed between, and thus seals to, the top surface 68 of the bottom panel 18 and the bottom surface 70 of the rib 42, and around the opening 50 in the bottom panel 18, around the opening 46 in the roof 8, and around the shaft 44. This connects the shell 12 to the roof 8. These seals formed by connecting the cap nut 38 and gaskets 40 may be liquid/water tight and seal around an entirety of the shaft 44 and openings 46, 50, including the top portion 140 of the shaft 44 being covered and thus sealed by the cap nut 38, and thus preventing liquid passing through these seals, contacting the shaft 44, and entering into the interior 62 of the vehicle 2 through the openings 46, 50. If water or other liquid is present in the interior 14 of the shell 12 or between the bottom panel 18 and the roof 8, then these seals may inhibit/prevent such water/liquid from entering through the opening 46 in the roof 8 into the interior 62 of the vehicle 2 that is defined by the roof 8.

Moreover, the vertical portions 72 may act as dams to any water/liquid that may be on the top surface 68 of the bottom panel 18, and thus inhibit such water/liquid from reaching the opening 54 in the rib 42, and thus providing even more protection against leaking through the opening 54 into the interior 62 of the vehicle 2. The sealing arrangement may include other components being sandwiched between the head 56 of the bolt 36 and the cap nut 38, including a stiffener 76 and roof arch 78.

The bottom panel 18 may be connected to the roof 8 before the bottom panel 18 is connected to the top panel 16 and/or to the front panel 20, i.e. before the panels are connected to form the shell 12 and the interior 14. In this instance, the cap nut 38 may be accessible at the top surface 68 of the bottom panel 18, and thus simply held in place, e.g. by hand, at the opening 50 in the bottom panel 18 when it is threaded onto the bolt 36.

Alternatively, the bottom panel 18 may be first connected to one or both of the top panel 16 and the front panel 20 to form the shell 12 and the interior 14 of the shell 12, and thereafter the shell may be connected to the roof 8. In this instance, the cap nut 38 may not be accessible at the top surface 68 of the bottom panel 18 since the cap nut 38 is located in the interior 14 of the shell 12. In order to thread the cap nut 38 and bolt 36 together, the cap nut 38 may be pre-arranged and secured on the top surface 68 of the bottom panel 18 around the opening 50 in the bottom panel 18 (e.g. by adhesive or friction fit), then the bottom panel 18 may be connected to the top panel 16 and front panel 20 to form the interior 14 of the shell 12. The shell 12 may then be arranged on the roof 8 such that the openings 50 in the bottom panel 18 are aligned with respective openings 46 in the roof 8. The bolt 36 may then be inserted, e.g. from the interior 62 of the vehicle 2, up through the openings 46 in the roof 8 and the openings 50 in the bottom panel 18, and threaded into respective cap nuts 38 secured on the top surface 68 of the bottom panel 18 in order to connect the bottom panel 18, and thus the RTM 4, to the roof 8.

A method of making the vehicle 2, e.g. an autonomous vehicle 2, includes providing the RTM 4, attaching the RTM 4 to the roof 8 of the vehicle 2 by inserting the shaft 44 of the bolt 36 up through the opening 46 in the roof 8 and up through the opening 50 in the shell 12 such that the top portion 140 of the shaft 44 is arranged in the interior 14, and connecting the shaft 44 and the cap nut 38 to each other in the interior 14.

The shell 12 (including the top panel 16, bottom panel 18, and front panel 20) may be arranged in place on the roof 8 so that it can be connected to the roof 8 (by connecting the bottom panel 18 to the roof 8 using the bolt 36 and cap nut 38), and such arranging can be accomplished by hand or with the aid of a mechanical lift system. In order to aid placement of the shell 12 on the roof 8, the present subject matter includes one or more eye plate lifting features 84 that are configured for lifting the shell 12 onto the roof 8 of the vehicle 2 by allowing a lifting mechanism to connect to the shell 12 via the lifting feature 84. In a non-limiting example, the shell 12 is arranged in place on the roof 8 using four lifting features 84 arranged at respective locations on the shell 12. More or less lifting features 84 can be utilized.

Figure 6:
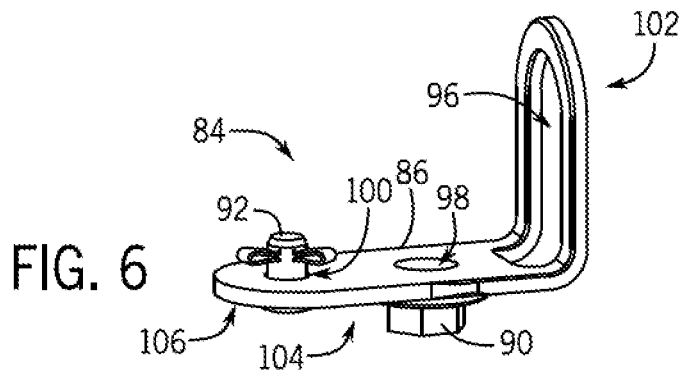
FIG. 6 is a perspective view of a lifting feature according to the present subject matter.
Figure 7:
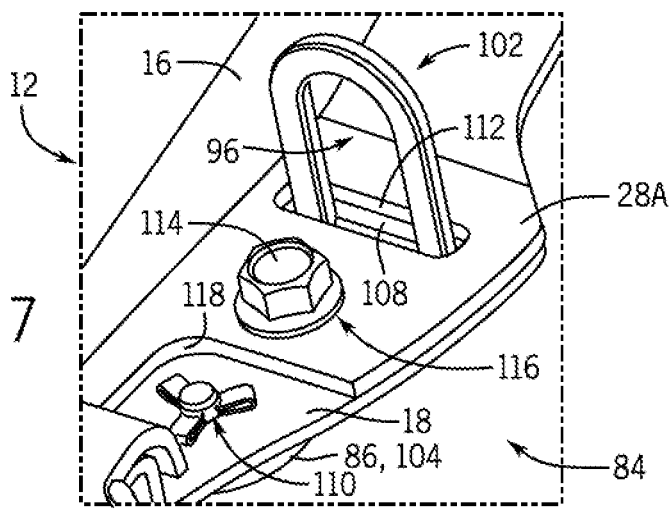
FIG. 7 is a perspective view of a portion of a roof top module including a lifting feature according to the present subject matter.
Figure 8:
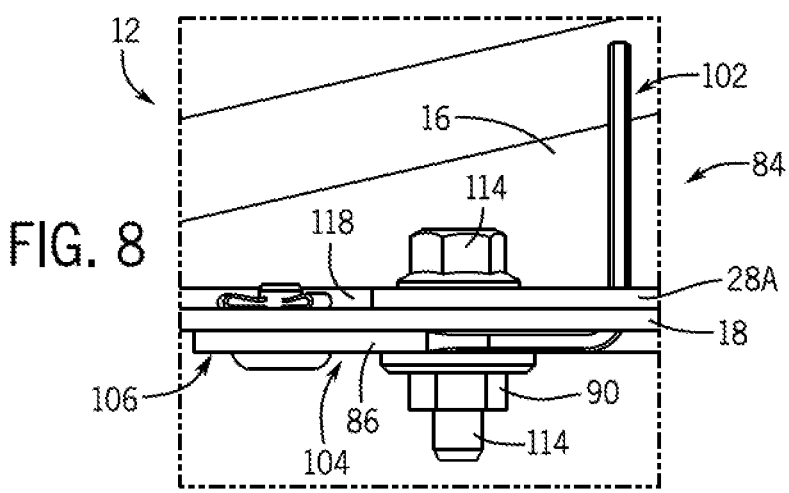
FIG. 8 is a side view of a portion of a roof top module including a lifting feature according to the present subject matter.

Each lifting feature 84 may include a lift plate 86, a nut 90, and a rivet 92. The lift plate 86 may include three through holes 96, 98, 100 extending through its thickness. A first portion 102 of the lift plate 86 is bent (up in FIG. 6) at an approximate right angle to a remaining portion 104 of the lift plate 86, such that the first portion 102 of the lift plate 86, which defines at least a portion of the first through hole 96, is arranged approximately perpendicular the remaining portion 104 of the lift plate 86, which defines the second and third through holes 98, 100 as shown in FIG. 6. The second through hole 98 is arranged along a length of the lift plate 86 between the first through hole 96 and the third through hole 100. The nut 90 is internally threaded and may be welded (or not) to a bottom surface 106 of the lift plate 86 around the second through hole 98. The nut 90 may also be part of a one-piece construction with the lift plate 86, such as being integrally formed with the lift plate 86. Alternatively, the first through hole 96 could be internally threaded, and the nut 90 may thus be eliminated.

The lift plate 86 may be arranged under the bottom panel 18 where the first portion 102 of the lift plate 86 is inserted up through a slot 108 in the bottom panel 18, which insertion operates to align the lift plate 86 with the bottom panel 18. The rivet 92 may be inserted up through the third through hole 100 of the lift plate 86 and a through hole 110 in the bottom panel 18 and crimped to thereby connect the lift plate 86 to the bottom panel 18. The rivet 92 may be replaced by a weld or other connector, or omitted.

The lifting feature 84 may also be arranged under a flange 28 of the top panel 16 (which is a flange 28 of the shell 12), by inserting the first portion 102 of the lift plate 86 up through a slot 112 in the flange 28, which insertion operates to align the lifting feature 84 with the flange 28 and the top panel 16. The rivet 92 may be arranged in a cut out 118 in the flange 28 so as to allow the bottom panel 18 and the flange 28 to lie flush against each other in the area of the flange 28, e.g. the remaining portion 104 of the lift plate 86 lies flush against the bottom surface 66 of the flange 28. The flange 28 may be sealed to the bottom panel 18 so as to prevent water intrusion into the interior 14. A bolt 114 is then inserted, and thus extends, from the top and down through a hole 116 in the flange 28, through a corresponding hole (not shown) in the bottom panel 18, and then through the second through hole 98 in the lift plate 86 so as to engage the nut 90 at the bottom of the lift plate 86. The bolt 114 is then threaded into the nut 90 and tightened to connect the lifting feature to the flange 28 of the top panel 16 and to the bottom panel 18. A connector of a mechanical lift system may then releasably connect with the first portion 102 and first through hole 96 of the lift plate 86, which extend above the flange 28. The first through hole 96 thus forms an eye in the eye lift plate 86. This allows the mechanical lift system to engage the shell 12 for lifting the shell 12 to arrange it on the roof 8.

If the bottom panel 18 is initially connected to the top panel 16 and the front panel 20 to form the interior 14 of the shell 12, then the bottom panel 18 may be almost completely covered by the top panel 16 and front panel 20, and thus the lifting feature 84 may allow the bottom panel 18 to be engaged for lifting the shell 12 by the lifting feature 84 being arranged under and engaging the bottom panel 18 for lifting the shell 12 in place on the roof 8. The lifting feature 84, because it engages the bottom panel 18, thus allows for the lifting of the bottom panel 18, and thus the shell 12 using the connector of the mechanical lift system.

In order then to cover the exposed flanges 28, the RTM 4 includes the right-side panel 22 that is connected to the roof 8 to cover the right flange 28A and a right portion 32 of the roof 8 not otherwise covered by the shell 12, and the left-side panel 24 that is connected to the roof 8 to cover the left flange 28B and the left portion 34 of the roof 8 not otherwise covered by the shell 12.

A method of making a vehicle includes providing a roof top module 4 including the shell 12 defining the interior 14; the electronic device 6 (e.g. the sensor 10) arranged in the interior 14; the lifting feature 84 arranged on the flange 28 of the shell 12; and the applique 22, 24. The method includes using the lifting feature 84 to lift the roof top module 4 onto a roof 8 of the vehicle 2; attaching the roof top module 4 to the roof 8; and attaching the applique 22, 24 to the roof 8 to cover the flange 28, the lifting feature 84, and a portion 32, 34 of the roof 8 not covered by the shell 12.

The RTM 4 may include internal support structures arranged in the interior 14 of the shell 12 that connect the top panel 16 to the bottom panel 18 in a way that adds rigidity and support to the front center section of the top panel 16, i.e. where the sensors 10 are arranged, and the structures provide a mounting location for the sensors 10 in the interior 14. The structures may include a bracket 120. The top panel 16 may be connected to the bracket 120, which in turn is connected to the bottom panel 18 (either directly or through another component), which in turn is connected to the roof 8, thus supporting and offering rigidity to the front center section of the top panel 16.

Figure 9:
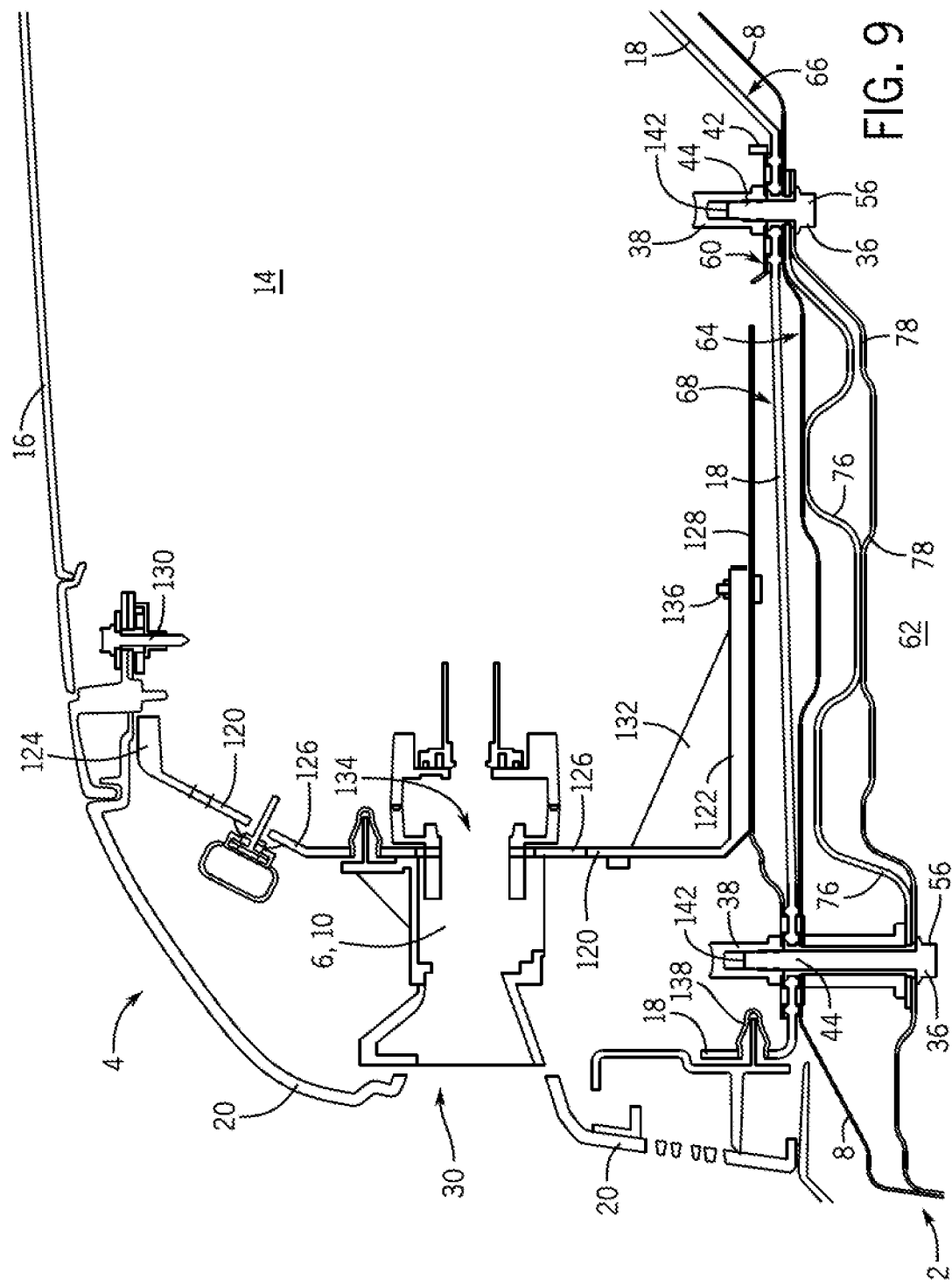
FIG. 9 is a cross section view of a roof top module according to the present subject matter.
Figure 10:
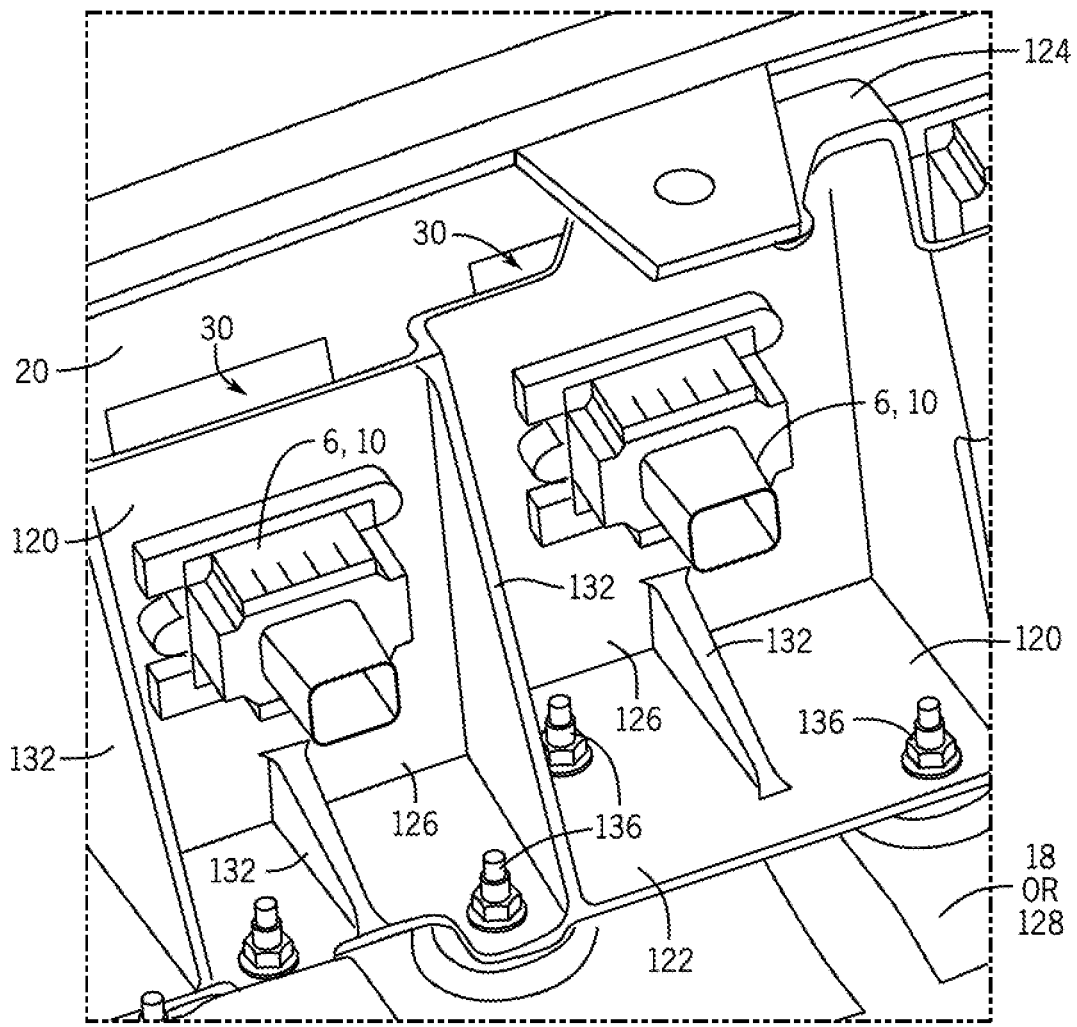
FIG. 10 is a perspective view of an interior portion of a roof top module according to the present subject matter.

The bracket 120 may have a general C-shaped cross section (See FIG. 9) including a bottom facet 122, top facet 124, and a middle facet 126 extending between and connecting together the bottom facet 122 and the top facet 124. The bracket 120 extends laterally along a width of the RTM 4 and provides support for the top panel 16 along the width of the top panel 16 to inhibit sagging of the top panel 16 due to its own weight. The bottom facet 122 and the top facet 124 may each be arranged essentially horizontal, and the middle facet 126 may be arranged essentially vertical, and thus may be angled by about 90 degrees with respect to each of the bottom facet 122 and the top facet 124. However, this configuration is not required and bracket 120 can have other configurations and/or the three facets 122, 124, 126 may have other orientations.

Figure 11:
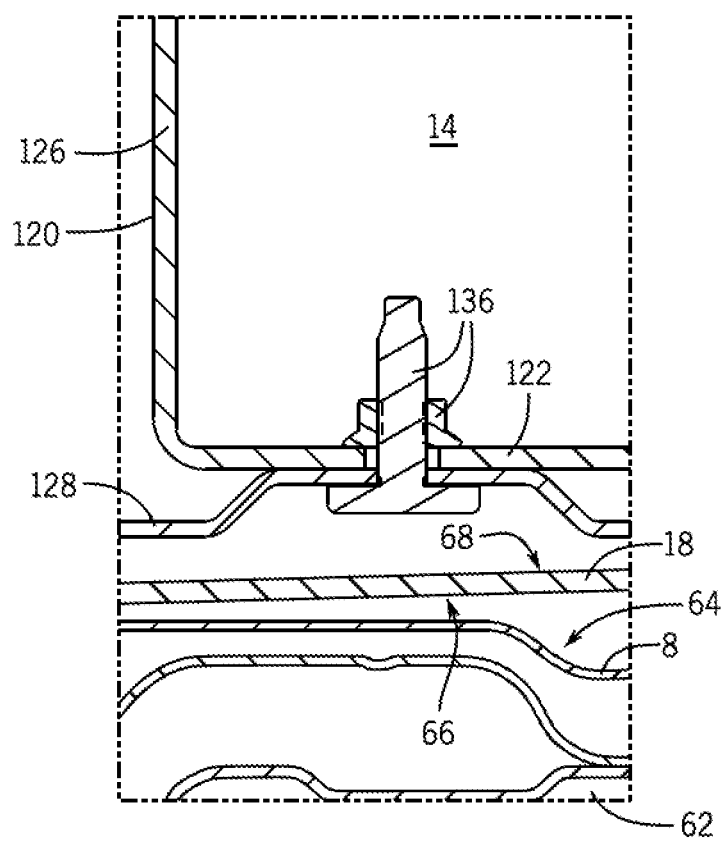
FIG. 11 is a cross sectional view of a portion of a roof top module according to the present subject matter.

The top panel 16 may be connected to the top facet 124, e.g. directly using a connector 130. The bottom facet 122 may be connected to the bottom panel 18, either directly or through direct connect with a bottom bracket 128, which is directly connected to the bottom panel 18. FIG. 11 depicts the bottom facet 122 of the bracket 120 being connected to the bottom bracket 128 with a mechanical fastener 136, and the bottom bracket 128 may then be connected directly to the bottom panel 18 and roof 8. The bottom facet 122 or the bottom bracket 128 may be directly connected to the roof 8 using one or more of the bolts 36 and cap nuts 38.

The bracket 120 may include one or more stiffener plates 132, each of which may have a general triangle shape, and be arranged perpendicular to both, extend between, and be connected to both, the bottom facet 122 and the middle facet 126. The stiffener plates 132 may be included to provide support for the bottom facet 122 and the middle facet 126 so as to maintain the mutual orientation of the bottom facet 122 and the middle facet 126. The stiffener plates 132 may also be arranged perpendicular to both, extend between, and be connected to both, the top facet 124 and the middle facet 126 so as to maintain the mutual orientation of the top facet 124 and the middle facet 126. The bracket 120 may be a one-piece component where the stiffener plates 132, the bottom facet 122, the top facet 124 and the middle facet 126 are part of the one-piece bracket 120, such as being integrally formed with each other. Alternatively, the bracket 120 may be a multiple-piece component where the stiffener plates 132, the bottom facet 122, the top facet 124 and the middle facet 126 are separately formed and then connected to each other.

The front panel 20 may also be connected to the bracket 120, e.g. the top portion of the front panel 20 may be connected at a top to the top facet 124 of the bracket 120 with the mechanical fastener 136, and thus the front panel 20 may be supported and made rigid by the bracket 120 in a similar way as the top panel 16. The bottom portion of the front panel 20 may be connected at a bottom to the bottom panel 18 with a fastener 138.

The sensors 10 may be mounted to the bracket 120, e.g. to the middle facet 126, and thus the bracket 120 is referred to herein as a sensor bracket 120. The sensor bracket 120 may include one or more sensor openings 134 in the middle facet 126, through which respective sensors 10 are inserted and mounted to the bracket 120. When the sensors 10 are mounted to the bracket 120, the sensors 10 may align with the apertures 30 in the front panel 20, through which the sensors 10 can detect characteristics of the vehicle 2 and/or the environment surrounding the vehicle 2. The weight of the sensors 10, when mounted on the bracket 120, may be transferred through the bracket 120 to the bottom panel 18 and to the roof 8, and may thus not be transferred to the top panel 16 and thus may inhibit a front middle portion of the top panel 16 from sagging or warping down into the interior 14 under its own weight or under the weight of the sensors 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle including a roof top module connected to a roof of the vehicle, the roof top module comprising:
    a shell defining an interior;
    an electronic device arranged in the interior;
    a bolt; and
    a cap nut;
    wherein a shaft of the bolt extends up through an opening in the roof and up through an opening in the shell, a top portion of the shaft is arranged in the interior, and the cap nut covers the top portion of the shaft;
    wherein the shaft and the cap nut are connected to each other in the interior, thereby connecting the shell to the roof and creating a seal around the opening in the shell and thus preventing liquid in the interior from passing through the opening in the shell;
    wherein the shell includes a bottom panel and the opening in the shell is an opening in the bottom panel; and
    wherein the shell includes a rib arranged on a top surface of the bottom panel, and the shaft of the bolt extends up through an opening in the rib.

2. The vehicle according to claim 1, wherein:
the cap nut defines a threaded blind hole,
the shaft of the bolt is threaded; and
the shaft is threaded into the threaded blind hole to connect the bolt to the cap nut.

3. The vehicle according to claim 1, wherein the bottom panel is formed of a water-resistant material and includes a plurality of drainage channels configured to direct water away from the opening in the bottom panel.

4. The vehicle according to claim 1, wherein:
the rib extends along a periphery of the bottom panel to provide structural reinforcement to the roof top module, and wherein the rib includes multiple openings for receiving multiple bolts to secure the shell to the roof.

5. The vehicle according to claim 1, wherein:
the rib has a U-shape in cross section and defines a channel; and
the cap nut is arranged in the channel and seals against a top surface of the rib and thus seals the opening in the rib.

6. The vehicle according to claim 1, wherein:
the roof top module includes a first gasket and a second gasket;
the first gasket is arranged between the roof and the bottom panel and creates a seal between the roof and the bottom panel around the shaft;
the second gasket is arranged between the bottom panel and the rib and creates a seal between the bottom panel and the rib around the shaft; and
the seal around the opening in the shell, the seal between the roof and the bottom panel around the shaft, and the seal between the bottom panel and the rib around the shaft together combine to prevent a liquid from entering through the opening in the roof.

7. The vehicle according to claim 6, wherein the first gasket and the second gasket each include ethylene propylene diene monomer rubber foam.

8. The vehicle according to claim 1, wherein the shell further includes a top panel and a front panel, and wherein the top panel and the front panel are connected to the bottom panel to thereby define the interior.

9. The vehicle according to claim 1, further including a right-side panel connected to the roof and a left-side panel connected to the roof, wherein:
the roof top module covers a central portion of the roof;
the right-side panel covers a right portion of the roof to a right of the central portion; and
the left-side panel covers a left portion of the roof to a left of the central portion.

10. The vehicle according to claim 9, wherein:
the right-side panel covers a right flange of the shell; and
the left-side panel covers a left flange of the shell.

11. The vehicle according to claim 1, wherein the vehicle is a fully autonomous driven vehicle and the electronic device includes a sensor that detects a characteristic of the vehicle or a characteristic of an environment surrounding the vehicle.

12. A vehicle roof top sensor module configured to be mounted on a roof of an autonomous vehicle, the vehicle roof top sensor module comprising:
a shell defining an interior;
a sensor arranged in the interior and configured to detect a characteristic of the autonomous vehicle or a characteristic of an environment surrounding the autonomous vehicle;
a bolt; and
a cap nut;
wherein a shaft of the bolt is configured to be inserted up through an opening in the roof and up through an opening in the shell so that a top portion of the shaft is arranged in the interior, and the cap nut covers the top portion of the shaft;
wherein the shaft and the cap nut are configured to be connected to each other in the interior so that the cap nut covers the top portion of the shaft, and thereby connecting the shell to the roof, creating a seal around the opening in the shell and thus preventing liquid in the interior from passing through the opening in the shell;
wherein the shell includes a bottom panel and the opening in the shell is an opening in the bottom panel;
wherein the shell includes a rib arranged on a top surface of the bottom panel, and the shaft of the bolt extends up through an opening in the rib;
wherein the rib is configured to provide at least one of: structural reinforcement to the shell, a channel for routing wires connected to the sensor, or a mounting feature for securing the sensor within the interior of the shell.

13. The vehicle roof top sensor module according to claim 12, wherein:
the vehicle roof top sensor module includes a first gasket and a second gasket;
the first gasket is configured to be arranged between the roof and the bottom panel to create a seal between the roof and the bottom panel around the shaft;
the second gasket is configured to be arranged between the bottom panel and the rib to create a seal between the bottom panel and the rib around the shaft; and
the seal around the opening in the shell, the seal between the roof and the bottom panel around the shaft, and the seal between the bottom panel and the rib around the shaft together are configured to combine to prevent liquid from entering through the opening in the roof.

14. The vehicle roof top sensor module according to claim 12, wherein:
the rib has a U-shape in cross section and defines a channel; and
the cap nut is configured to be arranged in the channel and seal against a top surface of the rib to seal the opening in the rib.

15. The vehicle roof top sensor module according to claim 12, wherein:
the shell further includes a top panel and a front panel; and
the top panel and the front panel are connected to the bottom panel to thereby define the interior.

16. The vehicle roof top sensor module according to claim 15, wherein the front panel includes an aperture through which the sensor can detect the characteristic of the autonomous vehicle or the characteristic of an environment surrounding the autonomous vehicle.

17. A method of making a vehicle comprising:
providing a roof top sensor module, the roof top module including:
a shell defining an interior;
a sensor arranged in the interior;
a bolt; and
a cap nut
forming a bottom panel of the shell with a rib arranged on a top surface of the bottom panel;
attaching the roof top module to a roof of the vehicle by inserting a shaft of the bolt up through an opening in the roof and up through an opening in the bottom panel and the rib such that a top portion of the shaft is arranged in the interior, and connecting the shaft and the cap nut to each other in the interior;

wherein connecting the shaft and the cap nut to each other creates a seal around the opening in the shell, thus preventing liquid in the interior from passing through the opening in the shell;

wherein the cap nut covers the top portion of the shaft;

wherein the rib is configured to provide at least one of: structural reinforcement to the shell, a channel for routing wires connected to the sensor, or a mounting feature for securing the sensor within the interior of the shell; and wherein the sensor is configured to detect a characteristic of the autonomous vehicle or a characteristic of an environment surrounding the autonomous vehicle.

18. The method according to claim 17, wherein:

the shell includes a bottom panel and the opening in the shell is an opening in the bottom panel;

the shell includes a rib arranged on a top surface of the bottom panel;

the shaft of the bolt is inserted up through an opening in the rib to connect to the cap nut;

the roof top module includes a first gasket and a second gasket;

the first gasket is arranged between the roof and the bottom panel and creates a seal between the roof and the bottom panel around the shaft;

the second gasket is arranged between the bottom panel and the rib and creates a seal between the bottom panel and the rib around the shaft; and the seal around the opening in the shell, the seal between the roof and the bottom panel around the shaft, and the seal between the bottom panel and the rib around the shaft together combine to prevent liquid from entering through the opening in the roof.

19. The method according to claim 18, wherein:

the rib has a U-shape in cross section and defines a channel; and the cap nut is arranged in the channel and seals against a top surface of the rib and thus seals the opening in the rib.

* * * * *